United States Patent
Woodward et al.

(10) Patent No.: US 10,552,823 B1
(45) Date of Patent: Feb. 4, 2020

(54) SYSTEM AND METHOD FOR AUTHENTICATION OF A MOBILE DEVICE

(71) Applicant: Early Warning Services, LLC, Scottsdale, AZ (US)

(72) Inventors: Eric Woodward, Scottsdale, AZ (US); Rodger Desai, Greenwood Village, CO (US); Aaron Bartrim, Scottsdale, AZ (US); Betty Chan-Bauza, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 253 days.

(21) Appl. No.: 15/470,522

(22) Filed: Mar. 27, 2017

Related U.S. Application Data

(60) Provisional application No. 62/313,542, filed on Mar. 25, 2016.

(51) Int. Cl.
*G06Q 20/32* (2012.01)
*H04W 12/06* (2009.01)
(Continued)

(52) U.S. Cl.
CPC ....... *G06Q 20/3226* (2013.01); *G06Q 20/325* (2013.01); *G06Q 20/4014* (2013.01);
(Continued)

(58) Field of Classification Search
CPC .................................................. G06Q 20/322
(Continued)

(56) References Cited

U.S. PATENT DOCUMENTS 6,130,937 A 10/2000 Fotta
8,136,148 B1 3/2012 Chayanam et al.
(Continued)

FOREIGN PATENT DOCUMENTS

JP 11-338933 12/1999
JP 2002-259344 9/2002
(Continued)

OTHER PUBLICATIONS

Federal Communications Commission; "Wireless Local Number Portability (WLNP)—frequently asked questions"; May 18, 2016; available at: https://www.fcc.gov/general/wireiess-local-number-portability-wlnp.
(Continued)

*Primary Examiner* — Jessica Lemieux
(74) *Attorney, Agent, or Firm* — Kilpatrick Townsend Stockton LLP

(57) ABSTRACT

The security of a transaction conducted at a mobile device, using a one-time password to authenticate the mobile device user, is enhanced by requiring that the mobile device also be authenticated by providing a valid mobile device ID. A security server that provides the one-time password to the mobile device also provides a hyperlink that, when selected, causes a mobile device ID, such as an IMSI, to be retrieved from a SIM in the mobile device The retrieved mobile device ID is then sent to the security server. A database associated with the security server stores valid mobile device IDs, and compares the retrieved mobile device ID from the mobile device to the valid mobile device ID for that mobile device stored in the database. In alternative embodiments, the mobile device is authenticated without the use of a one-time password. In some cases the mobile device ID may be a phone number returned in an HTTP message header from the mobile device, and it is compared to a
(Continued)

mobile device ID maintained by a bank or other entity managing the transaction.

20 Claims, 10 Drawing Sheets

(51) Int. Cl.
    *H04L 29/06*         (2006.01)
    *G06Q 20/40*        (2012.01)

(52) U.S. Cl.
    CPC ...... *H04L 63/0838* (2013.01); *H04L 63/0876* (2013.01); *H04L 63/0884* (2013.01); *H04W 12/06* (2013.01)

(58) Field of Classification Search
    USPC .......................................................... 705/44
    See application file for complete search history.

(56) References Cited

U.S. PATENT DOCUMENTS

| | | | |
|---|---|---|---|
| 8,438,382 B2 | 5/2013 | Ferg et al. | |
| 8,490,168 B1 | 7/2013 | Holloway et al. | |
| 8,549,601 B2 | 10/2013 | Ganesan | |
| 8,806,592 B2 | 8/2014 | Ganesan | |
| 2002/0095507 A1 | 7/2002 | Jerdonek | |
| 2003/0028451 A1 | 2/2003 | Ananian | |
| 2003/0138084 A1 | 7/2003 | Lynam | |
| 2004/0030924 A1 | 2/2004 | Mizoguchi et al. | |
| 2004/0210536 A1 | 10/2004 | Gudelj et al. | |
| 2004/0225878 A1 | 11/2004 | Costa-Requena et al. | |
| 2004/0242238 A1 | 12/2004 | Wang et al. | |
| 2005/0135242 A1 | 5/2005 | Larsen et al. | |
| 2005/0172229 A1 | 8/2005 | Reno et al. | |
| 2005/0254653 A1 | 11/2005 | Potashnik et al. | |
| 2006/0168259 A1 | 7/2006 | Spilotro | |
| 2006/0168663 A1 | 7/2006 | Viljoen et al. | |
| 2006/0206709 A1 | 9/2006 | Labrou et al. | |
| 2006/0235795 A1 | 10/2006 | Johnson et al. | |
| 2007/0011724 A1 | 1/2007 | Gonzalez et al. | |
| 2007/0067828 A1 | 3/2007 | Bychkov | |
| 2007/0074276 A1 | 3/2007 | Harrison et al. | |
| 2007/0079135 A1 | 4/2007 | Salto | |
| 2007/0094150 A1 | 4/2007 | Yuen et al. | |
| 2007/0157304 A1 | 7/2007 | Logan et al. | |
| 2007/0174904 A1 | 7/2007 | Park | |
| 2007/0186095 A1 | 8/2007 | Ganesan et al. | |
| 2007/0198437 A1 | 8/2007 | Eisner et al. | |
| 2007/0279227 A1 | 12/2007 | Juels | |
| 2007/0283273 A1 | 12/2007 | Harrison | |
| 2008/0028447 A1 | 1/2008 | O'Malley et al. | |
| 2008/0034216 A1 | 2/2008 | Law | |
| 2008/0052180 A1 | 2/2008 | Lawhorn | |
| 2008/0109657 A1 | 5/2008 | Bajaj et al. | |
| 2008/0120707 A1 | 5/2008 | Ramia | |
| 2008/0172730 A1 | 7/2008 | Sandhu et al. | |
| 2008/0254765 A1 | 10/2008 | Eliaz | |
| 2009/0037983 A1 | 2/2009 | Chiruvolu et al. | |
| 2009/0093300 A1 | 4/2009 | Lutnick et al. | |
| 2009/0106138 A1 | 4/2009 | Smith et al. | |
| 2009/0119754 A1 | 5/2009 | Schubert | |
| 2009/0119776 A1 | 5/2009 | Palnitkar et al. | |
| 2009/0132813 A1 | 5/2009 | Schibuk | |
| 2009/0232515 A1 | 9/2009 | Marien | |
| 2009/0235339 A1 | 9/2009 | Mennes et al. | |
| 2009/0249076 A1 | 10/2009 | Reed et al. | |
| 2009/0249077 A1 | 10/2009 | Gargaro et al. | |
| 2009/0254572 A1 | 10/2009 | Redlich et al. | |
| 2009/0259588 A1 | 10/2009 | Lindsay | |
| 2009/0259848 A1 | 10/2009 | Williams et al. | |
| 2009/0265768 A1 | 10/2009 | Labaton | |
| 2009/0288159 A1 | 11/2009 | Husemann et al. | |
| 2009/0328168 A1 | 12/2009 | Lee | |
| 2010/0017860 A1 | 1/2010 | Ishida | |
| 2010/0024022 A1 | 1/2010 | Wells et al. | |
| 2010/0041391 A1 | 2/2010 | Spivey et al. | |
| 2010/0235897 A1 | 9/2010 | Mason et al. | |
| 2010/0262834 A1 | 10/2010 | Freeman et al. | |
| 2010/0268831 A1 | 10/2010 | Scott et al. | |
| 2011/0072499 A1 | 3/2011 | Lin | |
| 2011/0086616 A1* | 4/2011 | Brand .................... | G06Q 20/10 455/411 |
| 2011/0153496 A1 | 6/2011 | Royyuru | |
| 2011/0159848 A1 | 6/2011 | Pei et al. | |
| 2011/0161989 A1 | 6/2011 | Russo et al. | |
| 2011/0208801 A1 | 8/2011 | Thorkelsson et al. | |
| 2011/0265149 A1 | 10/2011 | Ganesan | |
| 2012/0005483 A1 | 1/2012 | Patvarczki et al. | |
| 2012/0124651 A1 | 5/2012 | Ganesan et al. | |
| 2012/0272056 A1 | 10/2012 | Ganesan | |
| 2013/0333006 A1 | 12/2013 | Tapling | |
| 2014/0273965 A1 | 9/2014 | Raleigh | |
| 2014/0317689 A1* | 10/2014 | Mogush ................ | H04L 63/126 726/4 |
| 2016/0014603 A1 | 1/2016 | Woodward | |
| 2017/0078859 A1* | 3/2017 | Kendrick ................ | H04W 4/16 |
| 2017/0364911 A1* | 12/2017 | Landrok ............ | G06Q 20/3825 |

FOREIGN PATENT DOCUMENTS

| | | |
|---|---|---|
| JP | 2003-186838 | 7/2003 |
| JP | 2005-209083 | 8/2005 |
| JP | 2006-221440 | 8/2006 |
| JP | 2007-102777 | 4/2007 |
| JP | 2007-328381 | 12/2007 |
| JP | 2008-123461 | 5/2008 |
| WO | 2007/103831 A1 | 9/2007 |
| WO | 2007/107868 A1 | 9/2007 |

OTHER PUBLICATIONS

Neustar; "Maximizing Consumer Contacts while Mitigating TCPA Risk"; Mar. 12, 2014, Becky Burr and Adam Russell, available at: https://www.neustar.biz/resources/videos/mitigate-tcpa-risk-and-conections-video.

YTD2525; "Enterprise HLR Lookup Portal and API," published May 30, 2014 at blog YTD2525, citing hlr-lookups.com as the source, available at: https://ytd2525.wordpress.com/2014/05/30/enterprise-hlr-lookup-portal-and-api/.

Dryburgh, et al.; "Signaling System No. 7 (SS7/C7): Protocol, Architecture, and Services"; Cisco Press, Aug. 2, 2004 available at: http://techbus.safaribooksonline.com/book/electrical-engineering/communicationsengineering/1587050404/introductions-and-overviews/ch03.

Malphrus; "Perspectives on Retail Payments Fraud"; Feb. 11, 2009, Economic Perspectives, vol. XXXIII, No. 1, 2009; available at: https://papers.ssrn.com/sol3/papers.cfm?abstract_id=1341233.

Australian Patent Examination Report No. 3, dated Jan. 22, 2014 for Australian Patent Application No. 201109699; all pages.

Office Action dated Nov. 28, 2013 for Australian Patent Application No. 2011209699; all pages.

Office Action dated Dec. 9, 2013 for Japanese Patent Application No. 2012-551244; all pages.

Gralla; "How the Internet Works", 2006, Que, pp. 346-347.

WOT (online); "Against Intuition Inc.", 2006 [retrieved on Aug. 24, 2012). Retrieved from the *Internet: web.archive.org/web/20061127233933/http://www.mywot.comlen/wot/help/wot_symbols_explained/.

International Search Report and Written Opinion, PCT/US2012/032840, dated Jun. 20, 2012; all pages.

International Search Report/Written Opinion, PCT/US2011/023525, dated Apr. 5, 2011; all pages.

International Search Report/Written Opinion, PCT/US2011/022486, dated Apr. 20, 2011; all pages.

International Search Report/Written Opinion, PCT/US2011/023528, dated Apr. 27, 2011; all pages.

International Search Report/Written Opinion, PCT/US2011/032295, dated Jun. 13, 2011; all pages.

(56) References Cited

OTHER PUBLICATIONS

International Search Report/Written Opinion, PCT/US2011/032271, dated Jul. 11, 2011; all pages.
International Search Report and Written Opinion mailed in International Application No. PCT/US2011/022482 dated Mar. 25, 2011; all pages.

* cited by examiner

SYSTEM AND METHOD FOR AUTHENTICATION OF A MOBILE DEVICE

CROSS-REFERENCE TO RELATED APPLICATIONS

This application is a non-provisional application which claims the benefit of U.S. Provisional Application No. 62/313,542, filed on Mar. 25, 2016, the complete disclosure of which is herein incorporated by reference.

BACKGROUND OF THE INVENTION

In many circumstances, it is important to verify that a mobile device is in the hands of a valid user prior to communicating with the device.

For example, as discussed in U.S. application Ser. No. 14/798,155, "SYSTEM AND METHOD FOR MOBILE NUMBER VERIFICATION," filed Jul. 13, 2015 (commonly owned with the present application and hereby incorporated by reference), an arrangement is disclosed for confirming that the user of a mobile device user has not changed (such as by a mobile device being deactivated and the mobile number re-assigned to a different user) prior to a bank or other institution using an automatic telephone dialing system to make a call to the mobile device.

Verifying or authenticating a mobile device can be especially important when a mobile device is being used to conduct a financial transaction. For example, mobile device users conducting financial transactions are often given one-time passwords to authenticate the user and complete a transaction. A one-time password is intended to prevent a fraudster from gaining access to a user's permanent password and using it for fraudulent transactions. However, sending a one-time password may itself involve some risk, e.g., when the password (even if encrypted) is sent over a public network, such as the internet or a wireless provider network, where it can be intercepted and decrypted.

For this reason, systems have been developed for sending one-time passwords over out-of-band communications channels, such as disclosed in U.S. Pat. No. 8,806,592, "METHOD FOR SECURE USER AND TRANSACTION AUTHENTICATION AND RISK MANAGEMENT," which is hereby incorporated by reference. Using out-of-band communications channels improve security since data is generally less accessible to hackers than data sent over a public network (e.g., where data is being entered at a website). The user receiving the one-time password can, e.g., enter the received password at a website, thus confirming that the user has in fact received the one-time password at the user's known mobile device. However, such arrangements also carry some risk, since a fraudster may hack a mobile device and control its operation, and thereby redirect or forward communications having passwords and other sensitive information to the fraudster's phone. Thus, the security of one-time passwords over out-of-band communications can also be compromised (e.g., when a fraudster attempting to access an account at an online banking website has gained control of a user's mobile device and redirected messages to the fraudster's phone, thus enabling the fraudster to receive the one-time password and enter that password at the website to gain access to the account).

There is thus arisen the need for providing enhanced security when communicating with a mobile device, such as when communicating a one-time password to complete a financial transaction.

BRIEF SUMMARY OF THE INVENTION

There is provided, in accordance with embodiments of the present invention, a system and method for authenticating a mobile device being used for a transaction.

In some embodiments, authenticating a mobile device when sending a one-time password fortifies or enhances the security of the one-time password, by confirming that authenticated mobile device was in fact the device that received the one-time password.

In other embodiments, authenticating a mobile device is accomplished without a transaction requiring the entry of a one-time password. In such embodiments, the mobile device can be authenticated by sending a message to the mobile device, with the authenticity of the phone verified by a message returned to a security server. Thus, the entity with whom the transaction is being conducted is a assured that it is dealing with the authorized user/mobile phone (even without entry of a one-time password).

A more complete understanding of the present invention may be derived by referring to the detailed description of the invention and to the claims, when considered in connection with the Figures.

DETAILED DESCRIPTION OF THE INVENTION

Figure 1:
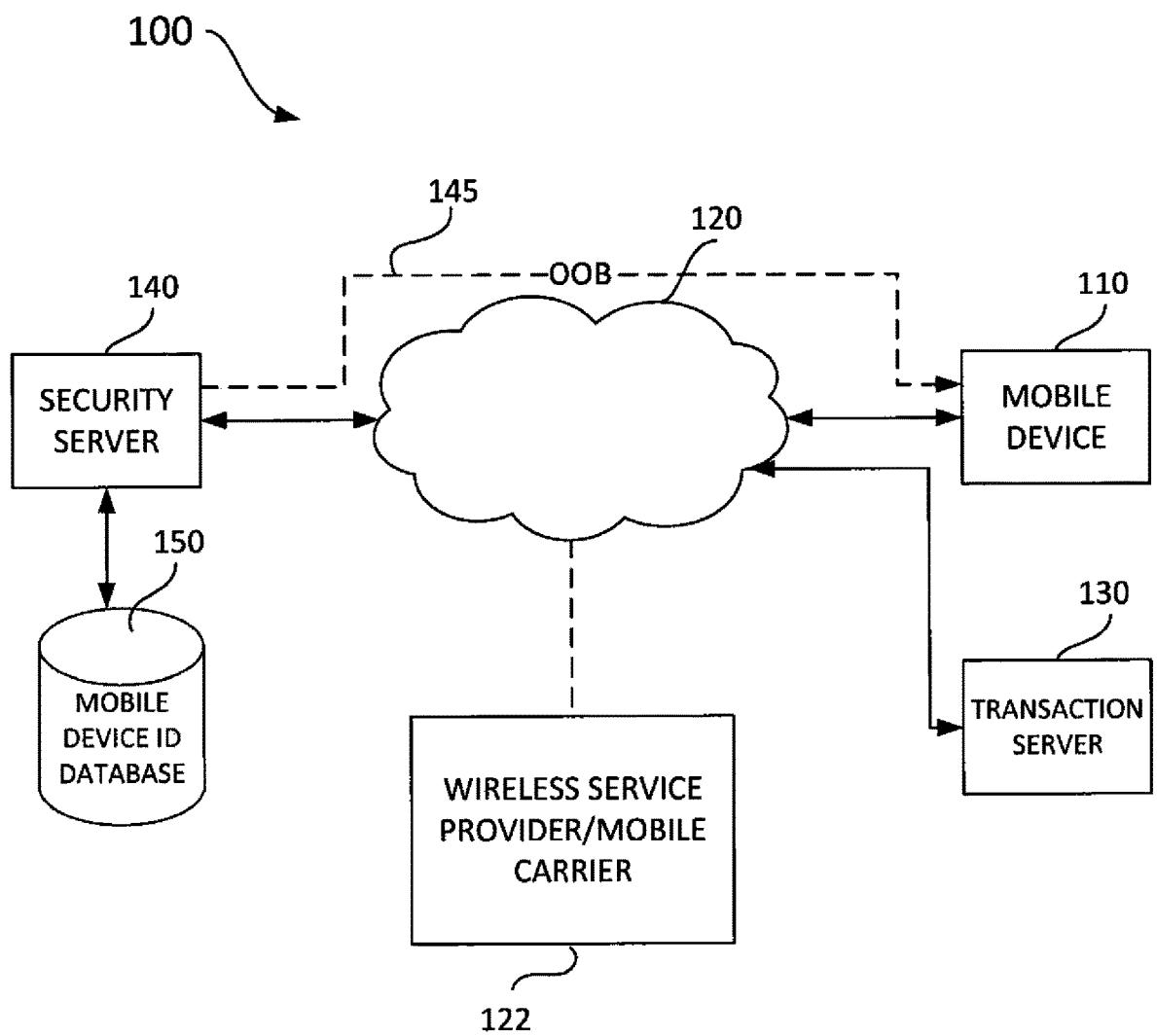
FIG. 1 is a block diagram showing a system for enhancing security when using a one-time password to authenticate a user, by additionally authenticating a mobile device of the user.

There are various embodiments and configurations for implementing the present invention. Generally, embodiments provide systems and methods for authenticating a mobile device when being used to conduct a transaction, in addition to any authentication of the user operating the mobile device. As an example, when a customer is accessing an on-line banking website (either through the use of a mobile device or at a computer or other device separate from the mobile device), the website operator may send a message (out-of-band) to the customer's mobile device confirming that the customer is attempting the access. In some cases a fraudster may have hacked the customer's mobile device (and is redirecting messages to a device of the fraudster). Embodiments of the invention permit the website operator (such as a bank) to confirm that any message sent to the customer has in fact been sent to the authenticated customer mobile device.

As an example, in order to authenticate a user when conducting a transaction at a website, a one-time password (OTP) may be sent to the user to be entered at the website. Such a one-time password provides greater security than a permanent or multi-use password that, over time, could be compromised (such as by a fraudster observing a user when entering a password or by hacking into a system that stores user passwords). The one-time password may be sent to the user via an out-of-band (OOB) communications channel, i.e., a communications channel that is separate and independent of the website being used (such email or text). In some cases, the OOB communications channel may send the one-time password to a device separate from the one being used to conduct the transaction. A description of the use of one-time passwords being sent over OOB communications channels can be found, for example, in aforementioned U.S. Pat. No. 8,806,592. One embodiment of the present invention enhances the security associated with one-time passwords by essentially requiring a mobile device, at which a one-time password is being received, to also authenticate itself. In alternative embodiments to be described, authentication may be achieved without the user receiving a one-time password, such as by sending an OOB message to a device of the user that requires a response (such as by clicking on a link), and examining a message sent by the mobile device in response to the activated link to confirm whether it has been sent by the actual device of the authorized user.

In one described embodiment, a mobile device to which a one-time password may be sent is examined for a unique mobile ID, such as international mobile subscriber identity (IMSI) data that is stored at a subscriber identification module (SIM) in the mobile device. The IMSI is unique to the mobile device and is used by the mobile service provider in communicating with the mobile device. In this described embodiment, the IMSI is retrieved from the SIM in response to the user selecting a hyperlink provided to the mobile device. The activation of the link may, for example, launch an application resident on the mobile device that causes the mobile device to retrieve the IMSI from its SIM. The retrieved IMSI is sent to a security server that compares the retrieved IMSI to a valid or correct IMSI for that mobile device (i.e., the IMSI used by the mobile service provider in communicating with the mobile device). A mobile ID database associated with the security server may store a valid IMSI for mobile devices that have been enrolled for conducting transactions using one-time passwords.

In this particular embodiment, if the phone has been authenticated by a valid IMSI, the one-time password may then be sent from the security server to the mobile device, to be entered at the mobile device for authenticating the user. Alternatively, the one-time password may be incorporated (e.g., as metadata) in the previously mentioned hyperlink that is sent and selected at the mobile device in order to retrieve the IMSI. The activation of the hyperlink may, for example, launch an application at the mobile device that automatically populates the one-time password in the appropriate data field at the website being used for the transaction, but the transaction is not approved until the security server authenticates the mobile device by matching the mobile ID retrieved from the device to a valid mobile ID (e.g., a valid IMSI stored at the mobile ID database associated with the security server).

In other embodiments, the mobile device can be authenticated without a one-time password being sent to the mobile device and entered at a website being used for a transaction. For example, in some preferred embodiments, messages between a security server and a mobile device can confirm that the mobile device is associated with a unique mobile ID (phone number, IMSI, IMEI, etc.) that matches a mobile ID known to the entity (e.g., a bank) with whom the user is attempting a transaction.

For example, in just-referenced embodiments of the invention, OOB communications channels can be used to authenticate a mobile device that is known to be used by a person authorized to conduct a transaction (e.g., at a banking website), without requiring that the customer enter a one-time password. When a customer enrolls for using an online banking website, the customer may be asked to provide an authorized mobile phone number (MSISDN). When a transaction is to be conducted, an OOB text message can be sent to the phone at the authorized phone number, requiring that the customer respond in order to complete a website transaction, such as by activating or clicking on a link provided with the OOB message. The activation of the link causes an http message to be sent back to a security server, and a header in the message can be examined for the phone number of the mobile device sending the message. If the phone number matches the authorized phone number, the security server authenticates the mobile device. If the phone number does not match the authorized phone number (e.g., in a case where the customer's phone may have been hacked and a fraudster is receiving messages and responding, and the fraudster's phone number is returned in the header of the message), the security server can alert the bank that someone other than the customer is responding to the OOB message and may be attempting to fraudulently access the customer's account at the website. In this particular embodiment, if the mobile device is authenticated, authentication at and entry to the website is accomplished without requiring the user of the mobile device to enter a one-time password.

Referring now to FIG. 1, a system 100 according to one embodiment of the invention is illustrated. The system 100 includes a mobile device 110 for a user to conduct a transaction, the mobile device communicating over networks 120 with a transaction server 130. As an example, the networks 120 may include a wireless service network 122 (operated by a wireless service provider for wireless communications with mobile devices) a public network, such as the Internet, and a private (e.g., a dedicated) communications network between the transaction server and security server). The transaction server 130 may manage a website used by a bank for conducting financial transactions at accounts maintained by the bank. A webpage may be loaded for display on the mobile device 110, requiring that the user provide a user name or ID and a one-time password in order to access an account. It is assumed, for purposes of the description relating to FIG. 1, that the user has enrolled the mobile device 110 for purposes of conducting transactions against the account. In response to the user providing a user ID (which may be, for example, the user's name or some other unique user identifier), the transaction server 130 accesses a security server 140 which generates a one-time password in order to authenticate the user to the website. The one-time password may be a random number or other unique digital signature that is based on a secret shared between the website and the security server (e.g., an encryption key). The one-time password is sent by the security server 140 to the mobile device 110, e.g., over an out-of-band (OOB) communications channel 145 within the networks 120, and is entered at the website in order to authenticate the user with the transaction server 130. The system as thus far described is known, and a more complete description can be found, for example, in aforementioned U.S. Pat. No. 8,806,592.

As explained earlier, communicating a one-time password by way of the out-of-band communications channel 145 provides security for a transaction, but such security could be undermined, e.g., by a fraudster surreptitiously gaining access to the mobile phone through the wireless provider network. The fraudster could then forward out-of-band communications (e.g., emails or text messages) from the mobile device 110 to a device used by the fraudster, thus permitting the fraudster to use the one-time password to access the user's account. In accordance with some embodiments of the invention, and in order to prevent the one-time password from being used at an unauthorized device, the security server 140 will also require that the mobile device 110 be authenticated.

Briefly, in accordance with one embodiment, the authentication of the mobile device 110 requires that the mobile device provide a unique mobile ID associated with the mobile device 110, such as (in a specific embodiment) the IMSI (international mobile subscriber identity) stored on a SIM (subscriber identification module) located within the mobile device. The unique mobile ID is retrieved from the mobile device 110 and provided to the security server 140. The retrieved unique mobile ID is compared to the correct or valid mobile ID for the mobile device 110 that is stored at a mobile device ID database 150. In embodiments to be more fully described below, the mobile device 110 retrieves its mobile ID in response to the activation of a hyperlink that is sent by the security server 140 to the mobile device 110 over the out-of-band communications channel 145 (e.g., via email or text message). The OOB message may also include an alert to the user that a transaction is being attempted (e.g., against an account of the user). The retrieved mobile ID (retrieved in response to clicking on the link) is sent to the security server 140 where it is compared to the correct mobile ID for the mobile device 110. If there is a match, the security server 140 notifies the transaction server 130 (via the networks 120) that the mobile device has been authenticated and the transaction can be completed (assuming the user has also entered the correct one-time password at the website).

It should be noted that, in some embodiments of the invention, variations in the operation of the system 100 are possible. For example, while the described embodiment uses the IMSI for authenticating the mobile device, other unique data or attributes of the mobile device could be used for such purpose. For example, in some wireless networks a Universal Integrated Circuit Card (UICC) performs, among other things, functions similar to those of a SIM and may include an IMSI or similar unique identifier (for purposes of the invention, the term "SIM" is intended to include a UICC and similar devices). Further, a SIM may include unique identifiers other than an IMSI, such as an Integrated Circuit Card Identifier (ICCID) that could be used in lieu of the IMSI. In currently described embodiments, it is noteworthy that the unique mobile ID is an identifier that would not be typically known or easily accessible to the public. Thus the unique mobile ID would not be a publicly used identifier, such as mobile telephone number. Rather, in the presently described embodiment, the IMSI or a similar internal identifier would typically only be known to the wireless service provider.

In some embodiments, a mobile device might have other unique information that could be used as the mobile ID and that would only be present at the authentic mobile device conducting the transaction, such as attributes of the mobile device (the specific configuration of hardware components and software applications and their individual internal identifiers), a hardware identifier (IMEI), or other data that is specific to the mobile device (personal contact information pertaining to the authorized user of the mobile device) that is stored at the mobile device. As should be apparent, these variations would require that the specific attributes or data be provided to the security server 140 in advance of being used for authentication, such as during enrollment of the mobile device. Further, in its broadest sense, the term "subscriber identity module" or "SIM" is used herein to refer to component of a mobile device that contains an established mobile identifier that uniquely identifies the mobile device (and is not publicly known), as contemplated by the foregoing description. However, in alternative embodiments to be described later, the particular operation of the messages and calls between the mobile device (using a mobile or wireless carrier) and the transaction server and security server permit the phone number (MSISDN) associated with the mobile device to be used to authenticate the phone.

Further, while the currently described embodiments use a hyperlink sent to the mobile device 110 that causes (when selected) the mobile ID to be retrieved from within the mobile device, the authentication of the mobile ID could be in response to other events initiated at the mobile device when a transaction is requested. For example, public and private keys could be stored in the mobile device as part of enrollment, and when transactions are later initiated the exchange of both the public and private keys between the mobile device and the security server could authenticate the mobile device. Alternatively, an application could be loaded at the mobile device during enrollment, and the application could automatically generate a reply text or other message to the security server (after user interaction at the website) confirming that the text with the one-time password arrived at the intended device.

Also, while the embodiment of FIG. 1 involves a transaction server maintained by or for a bank or other financial institution for completing account transactions, it should be appreciated that the scope of the invention is not so limited. For example, the retrieval of a unique mobile ID in order to authenticate a mobile device may have application to merchant transactions (e.g., where the mobile device is be used to purchase products at a merchant website), as well as other types of transactions where a mobile device might be used and where enhanced security could be provided by authenticating the mobile device (beyond required authentication, if any, of the user of the mobile device). Further, broader aspects of the invention involve various environments in which a user may be interfacing with an entity (bank, merchant) to conduct the transaction. For example, the user may be present in-person at a bank and in order to complete the transaction, the bank may want to authenticate the user based on authenticating the user's mobile device (e.g., by sending an SMS message). Also, the user could be at an ATM conducting a transaction or, as contemplated in embodiments described above, the user may be accessing a bank website using a mobile device or some other computing device (e.g., personal computer). In all these environments, the authentication of the mobile device is useful to the bank and avoiding a fraudulent transaction.

Figure 2:
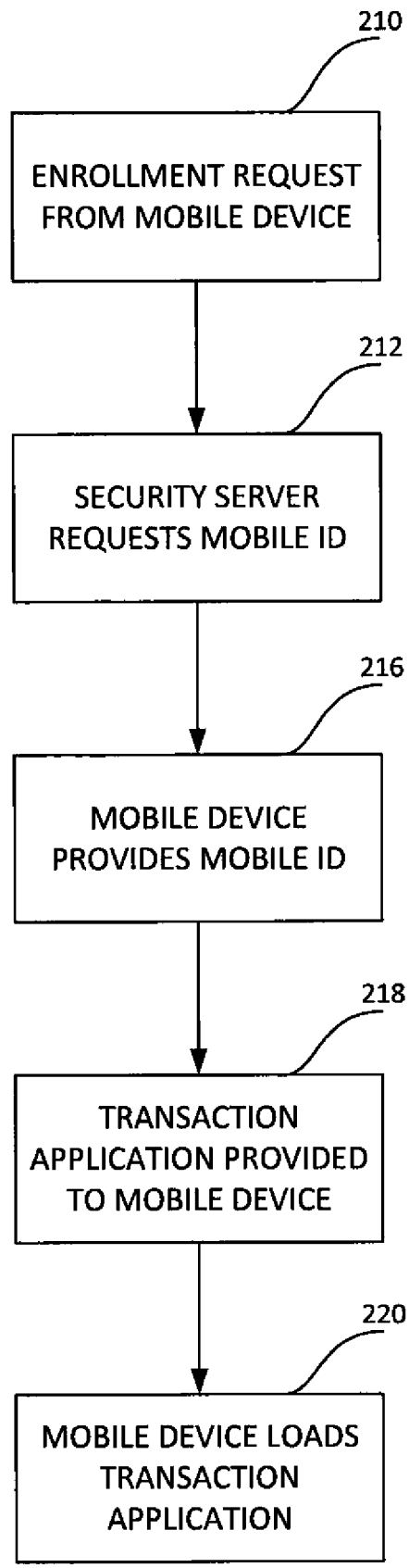
FIG. 2 is a flow diagram illustrating a process for enrolling a user in a program for conducting a transaction via a mobile device, wherein the mobile device is authenticated prior to conducting the transaction.

Turning now to FIG. 2, there is illustrated one embodiment of a process for enrolling a user for conducting transactions using a mobile device, such as the mobile device 110 being used for conducting financial transactions at the transaction server 130 in FIG. 1. For example, the enrollment process may occur when a user is invited by a bank or other institution maintaining the transaction server 130 to register/enroll a mobile device for online banking. Initially, at step 210, transaction server 130 receives at enrollment request from the user either from the mobile device 110 or from another computing device of the user (e.g., a personal computer, laptop, etc.). As part of the enrollment, the user would provide personal information of the user, to the extent not already maintained at the server 130, (such as a mobile telephone number, account holder name, account number(s), and other information needed to identify and authenticate (with trust) the user (social security number, address, account password, etc.). At step 212, the server 130 requests the IMSI (or other unique mobile ID) from the mobile device. This information is typically not known to or accessed by the user of the mobile device, but may be accomplished by invoking utility software (e.g., mobile device management code) commonly resident on the mobile device (prior to issuance to a customer/user), which causes the mobile device to interrogate its SIM and retrieve the mobile ID (IMSI). In some cases, the transaction server may provide an app to the mobile device during enrollment, that permits the transaction server to remotely interrogate the SIM and retrieve the IMSI (such apps are commercially available, e.g., Airwatch Mobile Device Management—www.air-watch.com). At step 216, the mobile ID is provided by the mobile device 110 to the server 140 (where it may be, in turn, stored at the mobile device ID database 150). The unique mobile ID acquired during enrollment (and stored at database 150) is validated or "trusted (by virtue of the authentication of the user during enrollment)."

At step 218, a transaction application (app) for subsequent use when conducting financial transactions is provided by the server 130. The sequence of steps seen in FIG. 2 has the advantage of permitting the security server 130 to confirm the validity of the mobile ID before providing the app to the mobile device. However, in some embodiments, it may not be necessary for the mobile device 110 to provide the mobile ID to be stored in the database 150, but rather mobile IDs (such as IMSIs) may be provided individually or in batch form from one or more mobile (wireless) service providers in response to a request from the entity operating the security server 140. The app provided to the mobile device at step 218 is loaded or stored at the mobile device at step 220 and can thereafter be used by the mobile device for conducting transactions at the transaction server 130.

As will become apparent later, and depending upon which of various embodiments are being implemented, various steps or procedures illustrated in FIG. 2 may be omitted or modified.

Figure 3A:
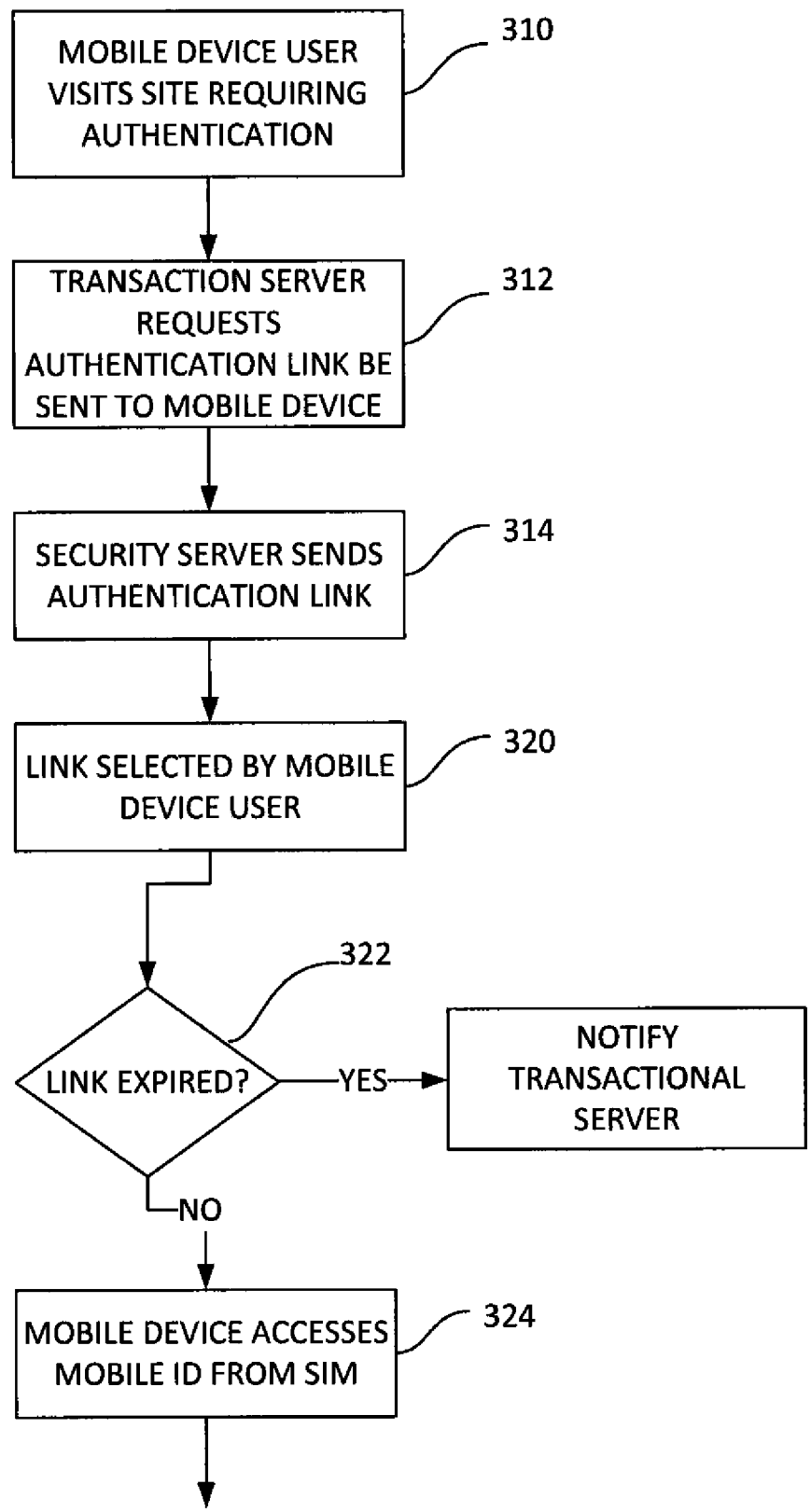
FIGS. 3A, 3B and 3C are, taken together, a flow diagram illustrating a process used in the system of FIG. 1 for both authenticating a user via a one-time password and authenticating the mobile device of the user.
Figure 3B:
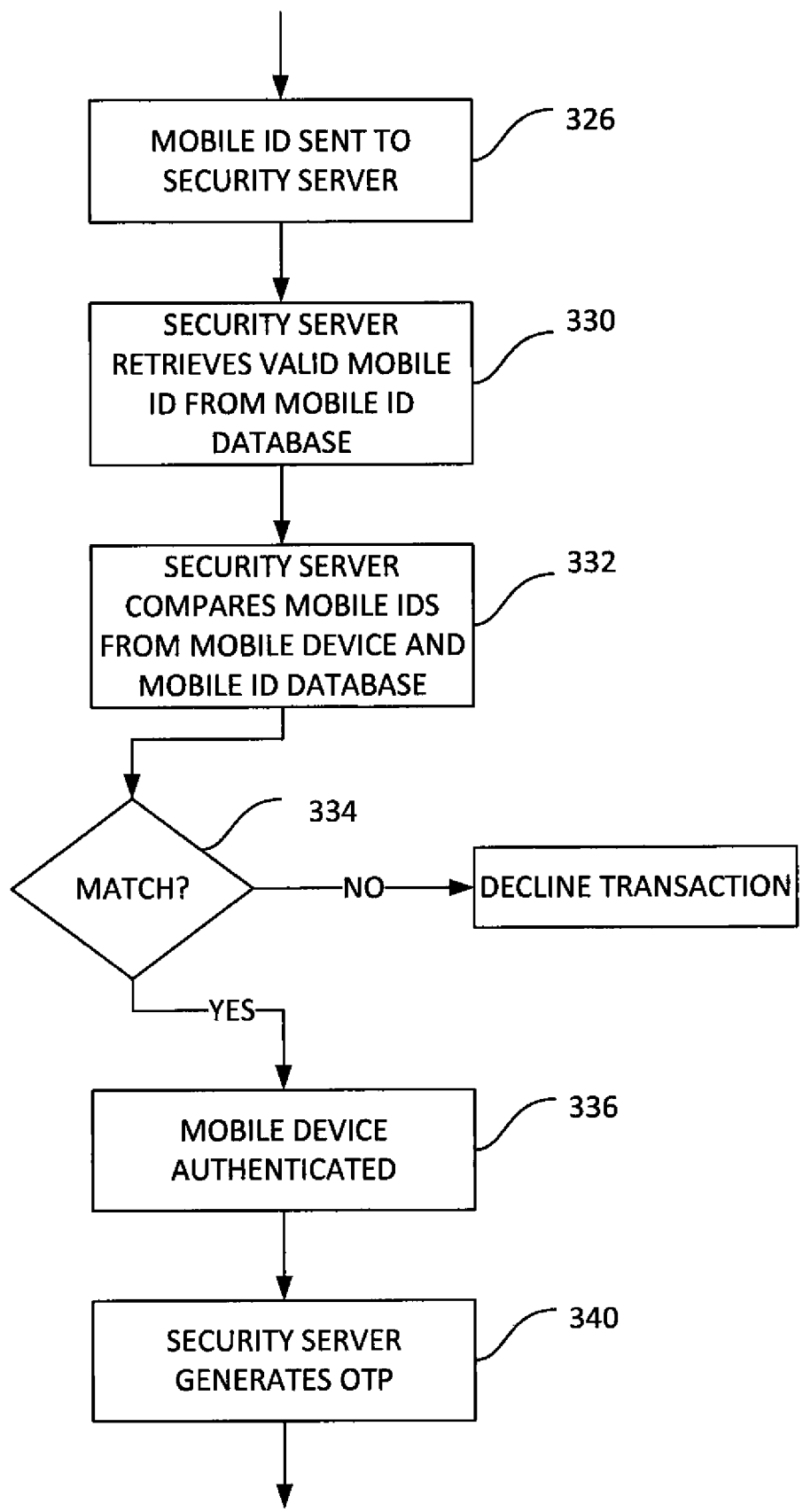
Figure 3C:
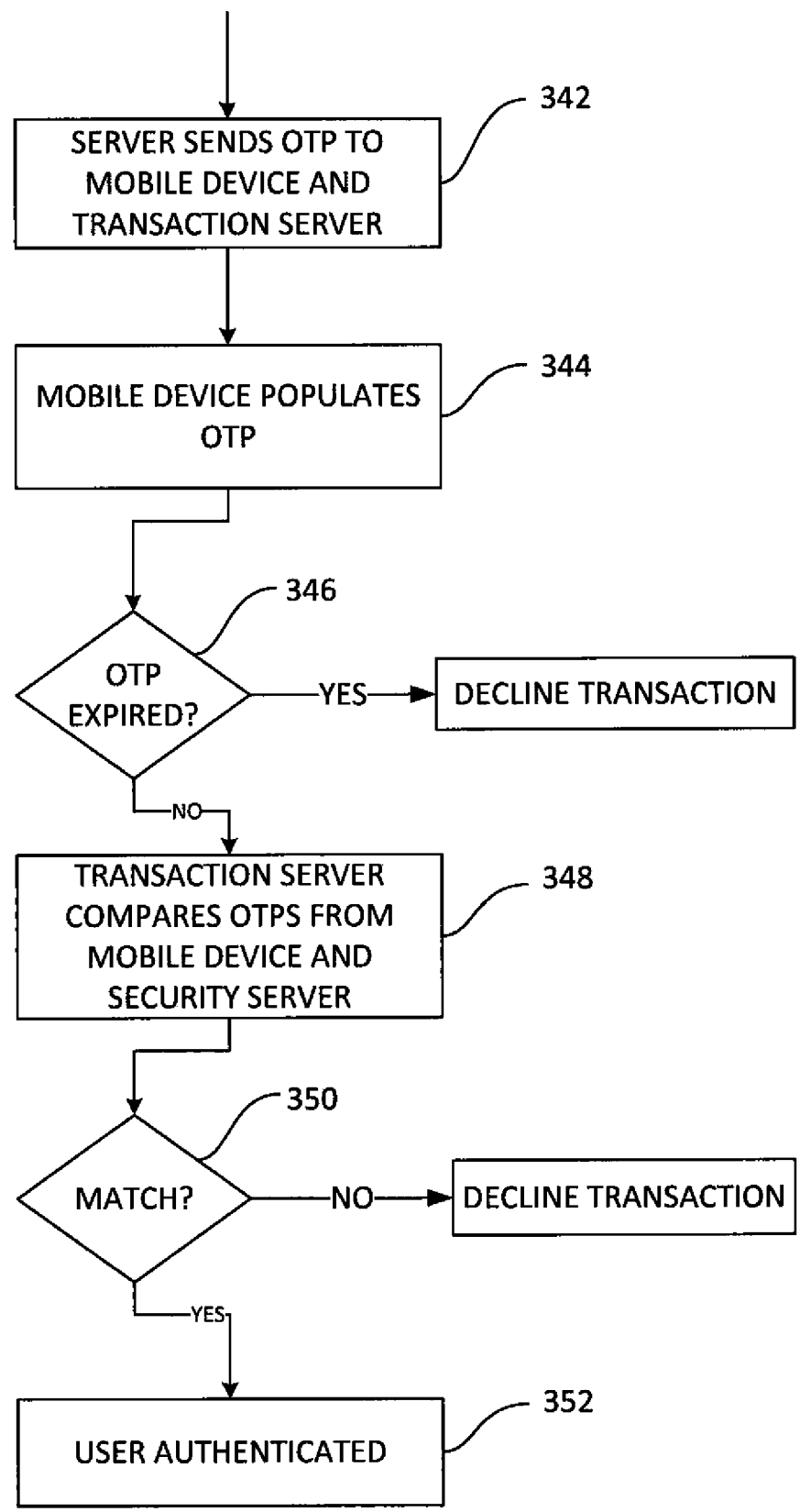

FIGS. 3A, 3B and 3C illustrate one embodiment of a process within system 100, wherein a transaction conducted by the mobile device 110 at the transaction server 130 is completed only if the mobile device is authenticated by the security server 140. The process of FIGS. 3A, 3B and 3C occurs when a mobile device has been previously enrolled/registered, such as by using the process of FIG. 2.

At step 310, the user of the mobile device 110 visits a website maintained by the server 130. The website (and the transactions conducted at that website) may require that both the user and the mobile device be authenticated and, as described earlier in conjunction with FIG. 1, could be used by an account holder to access accounts maintained at a financial institution. In response to the user requesting a transaction, the transaction server 130 sends a request (via networks 120) to the security server requesting that a one-time password be generated for authenticating the user and that the mobile device be authenticated. Such requests can be in the form of a request that an authentication hyperlink be sent from the server 140 to the mobile device, step 312, with the mobile device identified by a user ID associated with the mobile device, such as the mobile device phone number. At step 314, the security server sends the authentication hyperlink to the mobile device via the out-of-band communications channel 145 (e.g., via SMS text message). The hyperlink is selected by the user at step 320 and the transaction app loaded onto the mobile phone during enrollment is launched. The hyperlink may include, in its metadata, a link expiration time/date in order to prevent the link from being present at the mobile device for too long of a period before it is activated, and at step 322 the mobile device determines whether the hyperlink has expired (e.g., by the app examining the expiration time/date). If the link has expired, the transaction server 130 and security server 140 are notified. The security server 140 may send a new link (the transaction server 130 may require that the user re-login to the website prior to a new link being sent to the user). If the link has not expired, the transaction app causes the mobile device to retrieve its mobile ID (IMSI) from the SIM in the mobile device, step 324. The retrieved mobile ID is sent to the security server at step 326. The security server then accesses the mobile device ID database 152 to access the valid/correct mobile ID for the mobile device 110, step 330, and compares that valid/correct mobile ID to the mobile ID received from the mobile device, step 332. If the mobile IDs match, step 334, the security server 140 authenticates the mobile device, step 336, and then generates a one-time password, step 340, to be sent to the mobile device 110 and the transaction server 130. If the mobile IDs do not match, then the security server determines that the mobile device attempting to conduct the transaction may be in the hands of someone other than the authorized user and, at step 334, declines the transaction.

The security server 140 sends the generated one-time password (OTP) to the mobile device (over the OOB channel 145) and to the transaction server 130 through the networks 120, step 342. At step 344, the mobile device (under the control of the transaction app) populates the one-time password into the appropriate password field of the website page present at the mobile device, from which it is sent to the transaction server 130 (in some cases, the user may be required to enter the one-time password manually). At step 346, the transaction server determines whether the one-time password has expired (for security purposes, the password has a limited use time and becomes unusable if too much time has elapsed from the time it was generated). For example, the one-time password may include, in its string of digits, certain values that represent and expiration time/date for the password, and those digits may be used by the mobile device to determine whether the password has expired. Alternatively, the security server 140 may provide an expiration time/date with the password when it is sent to the transaction server at step 342 and that expiration time/date may be used by the transaction server to determine whether the one-time password has expired. If the one-time password has expired, the transaction is declined at step 346. If the password has not expired at step 346, then the transaction server 130 compares the one-time password sent by the mobile device to the one-time password sent by the security server 140, step 348. If the one-time passwords match, step 350, then the user is authenticated and a transaction may be conducted, step 352. If the passwords do not match at step 350, then the transaction is declined.

Figure 4:
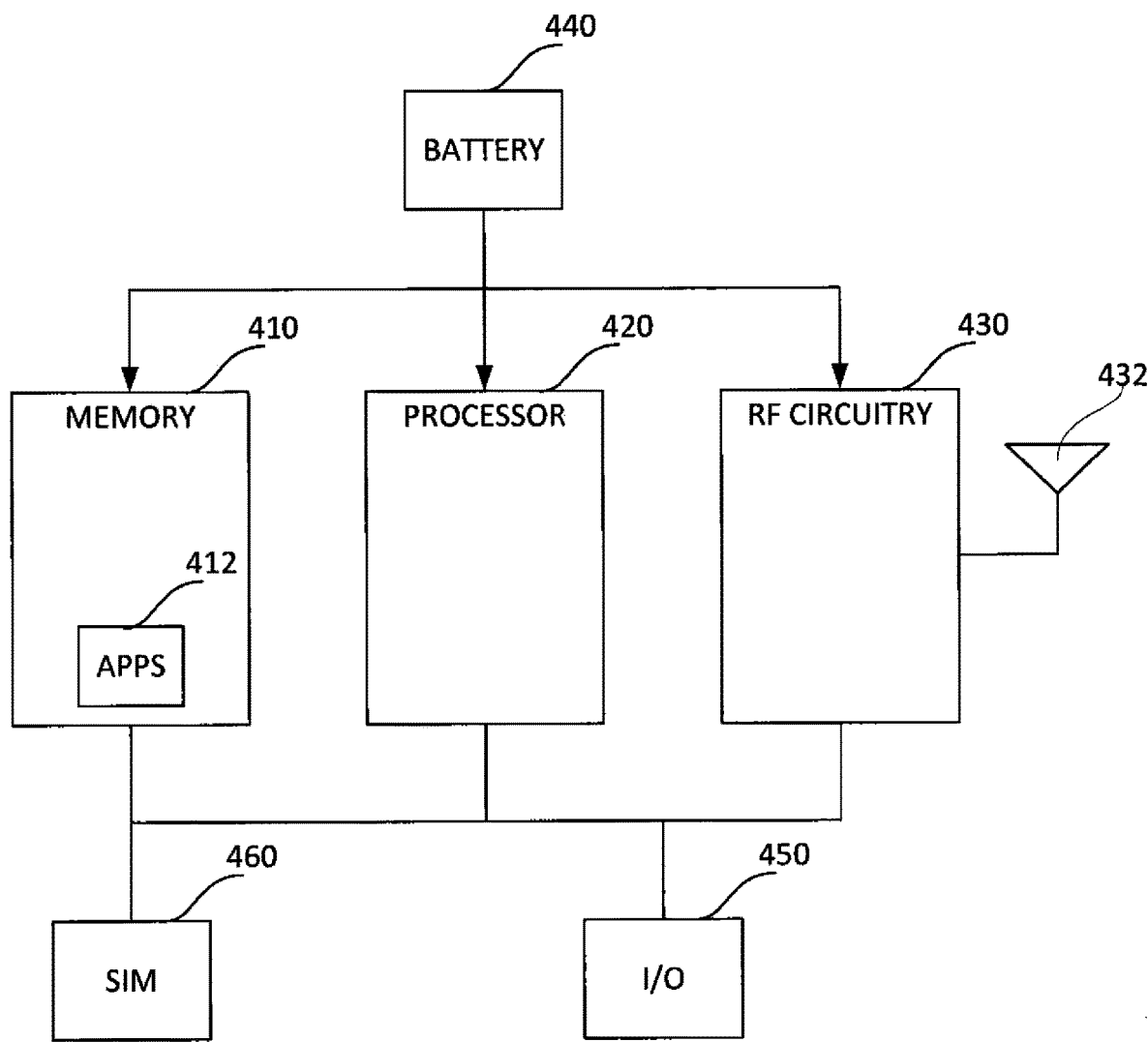
FIG. 4 is a simplified diagram of components in a mobile device being used to conduct a transaction, with the SIM of the mobile device accessed to retrieve a unique mobile identifier in order to authenticate the mobile device.

FIG. 4 illustrates the major components of a mobile device, such as the mobile device 110 seen in FIG. 1, for purposes of illustrating the retrieval of a mobile ID as described in connection with step 324 of FIG. 3A. As seen in FIG. 4, the illustrated mobile device includes a memory 410, a processor 420, and RF circuitry 430. The various components of the mobile device are powered by a battery 440. The data signals (as well as voice signals) are transmitted and received by the RF circuitry 430 through an antenna 432. The mobile device also includes I/O devices 450, which are conventional components for a user to enter, receive and display data and voice, such as a keyboard/keypad, speaker/microphone, display, camera and so forth. A SIM (subscriber identity module) 460 is connected to various other components within the mobile device, and as described earlier, contains, among other things, a unique mobile ID, such as a IMSI, used by the wireless service provider to identify and communicate with the mobile device. As noted earlier, in some wireless networks, the functions of a SIM are performed by a Universal Integrated Circuit Card (UICC). The memory 410 stores data and software used in the operation of the mobile device, such as software applications (apps) 412 that are launched and executed by the processor 420. The stored apps may include, among other things, the transaction app loaded onto the mobile phone as described earlier in conjunction with FIG. 2 (step 220).

As described earlier in conjunction with FIGS. 3A, 3B and 3C, in one embodiment, a hyperlink may be sent by the security server 140 (such as via a text message or email) when a mobile ID is to be retrieved at the mobile device. When the hyperlink is displayed and then selected by a user, the processor 420, under the control of the transaction app included in apps 412, may invoke the mobile device management utility for purposes of accessing the IMSI from the SIM 460, and provide the accessed IMSI in a data message by way of RF circuitry 430 (and antenna 432) to the networks 120 and then to the security server 140.

Figure 5:
FIG. 5 illustrates a hyperlink sent to the mobile device of FIG. 1 in accordance with one embodiment, with the hyperlink selected or activated by a user in order to authenticate the mobile device.

FIG. 5 illustrates one embodiment of the a structure of a hyperlink that could be provided from the security server 140 to the mobile device 110, as just described in connection with FIG. 4 and as earlier described in conjunction with FIG. 3A (step 314). In embodiments where the hyperlink launches (via the browser on the phone) a transaction app used for accessing the mobile ID, the URL scheme of the hyperlink is illustrated as "TRANSAPP," which is the name of the transaction app and is used by the browser of the mobile device 110 to open that app. Conventional hyperlinks include fields that contain any metadata that may be needed when the hyperlink is activated, and in FIG. 5 such data includes the path data "SECSERVER" and "ACCESSID" that instruct the transaction app to respond to a request from the security server 140 to access the mobile ID at the SIM 460 (FIG. 4) and return it to the security server 140. The path data may also include "OTHERDATA" that represents variables and other data needed by the transaction app to perform its functions. For example, in embodiments where the one-time password may be included with the hyperlink, the password may be part of "OTHERDATA."

In some embodiments, the transaction app might not be used to retrieve the IMSI from the SIM, but rather instructions/code may be included in OTHERDATA and invoke the necessary utility programs of the mobile device 110 to retrieve and send the IMSI to the security server 140.

Figure 6:
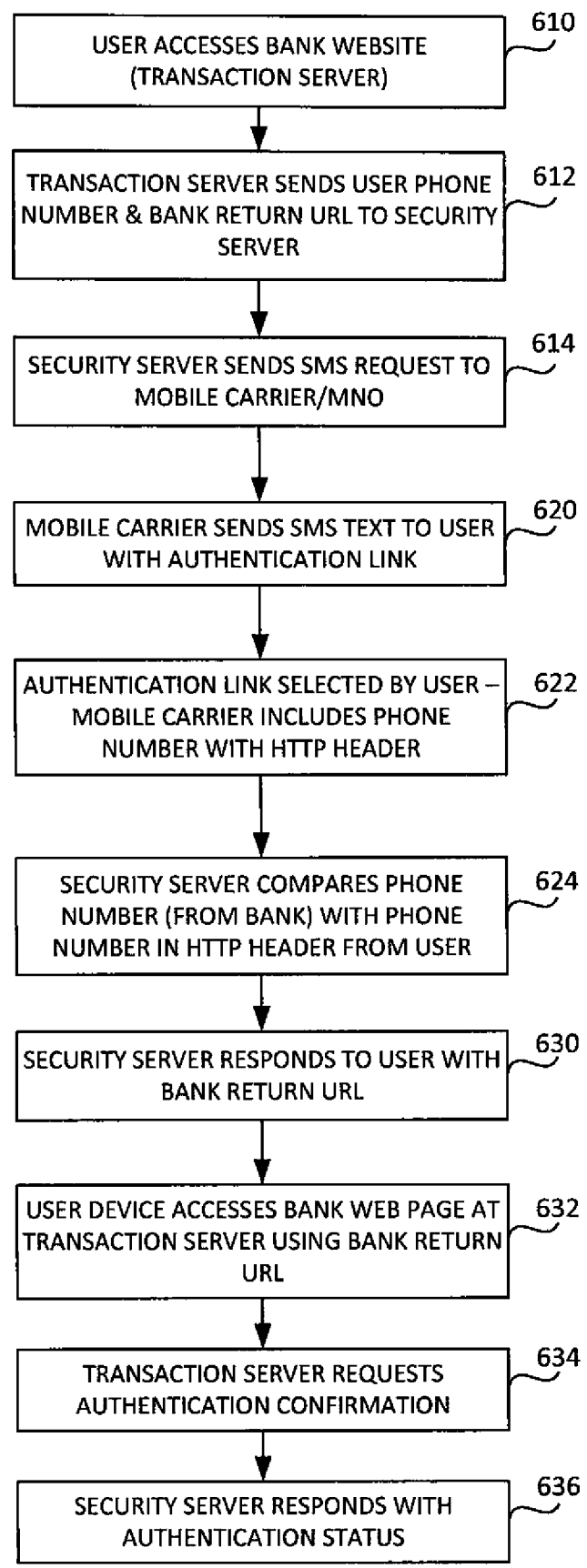
FIG. 6 is a flow diagram illustrating an alternative embodiment of a process used in the system of FIG. 1 for authenticating the mobile device of a user, where the user is not required to enter a one-time password.

FIG. 6 illustrates an alternative embodiment of a process used within system 100, wherein the mobile ID used to authenticate the mobile device is the mobile phone number of device which, as will be described, is obtained from header data in HTTP messages managed by the wireless service provider 122, without the need for the mobile device ID database 150 described in conjunction with the embodiment of FIGS. 3A-3C.

Figure 7:
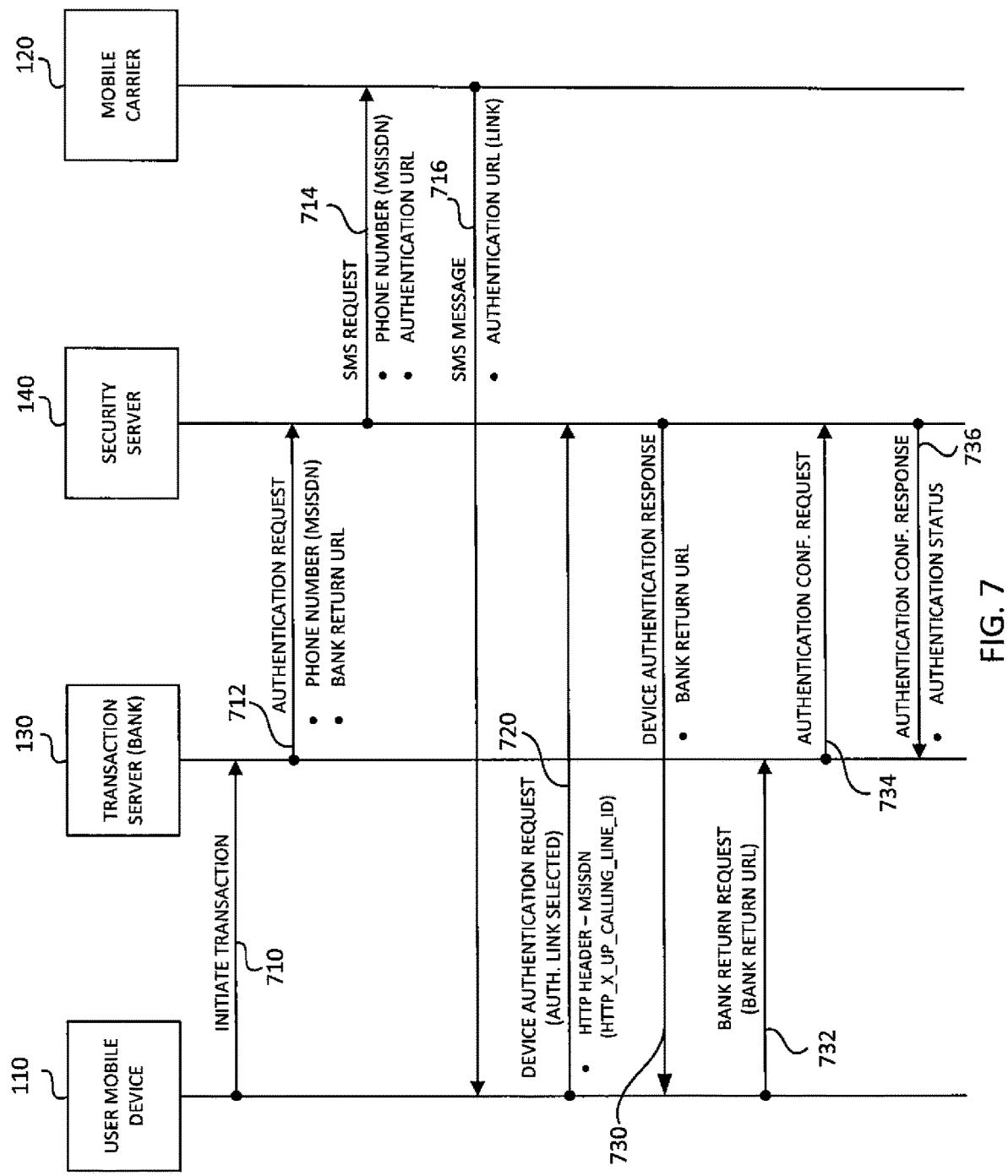
FIG. 7 is a diagram illustrating calls and messages between various components of the system of FIG. 1 for implementing the process seen in FIG. 6.

FIG. 6 described in conjunction with FIG. 7, which shows the flow of calls/messages between the user mobile device 110, transaction server 130, security server 140 and mobile carrier 122, for purposes of carrying out the process of FIG. 6. It should be noted that, for purposes of reducing the complexity of FIG. 7, that the message flows seen in FIG. 7 only show two substantive messages to and from the mobile carrier 120 (a message sent from the wireless carrier to the security server and an SMS message sent from the wireless carrier to the user mobile device). As should be understood, however, all messages from the user mobile device (e.g. to the transaction server 130 and the security server 140) are necessarily sent (at least initially) as wireless messages through the mobile carrier in order to reach their ultimate destination.

At step 610 (FIG. 6), the user accesses a bank website at the transaction server that requires authentication and a message 710 (FIG. 7) is sent from the mobile device to initiate the transaction. The transaction server identifies the user (e.g., the user may begin entering identifying information on the website) and the transaction server sends the phone number (MISDN) of the user and a bank return URL to the security server at step 612, using an authentication request message 712. The bank return URL has a purpose that will be evident as this description progresses, but briefly it is a URL that permits the user to return to the bank website at a desired page after the mobile device has gone through the authentication steps. The phone number included in the authentication request message 712 is the phone number of the user mobile device 110, and is known to be authentic and trusted by virtue of its being provided by the user during enrollment, such as the enrollment described earlier in conjunction with step 210, FIG. 2.

The security server then requests that an SMS text message be sent from the mobile carrier to the user mobile device at step 614, with an SMS request message 714. The SMS request message includes the phone number provided to the security server by the transaction server and an authentication URL (directed to a site at the security server) which will be used to provide a link for selection/activation by the user. At step 620, the mobile carrier sends to the mobile device, at the user's phone number provided via the security server, an SMS text message 716 that includes the authentication link. The SMS text message 716 when displayed at the mobile device may include text notifying the user that an attempt is being made to access the user's account and that the user should click on the displayed link if the user wants to proceed with that access.

At step 622, the link displayed as a result of the SMS message 716 is activated/selected by the user at step 622 and, in response, a device authentication request message 720 is sent by the user mobile device to the security server 140 (at the URL in the authentication link). A specific feature of the present embodiment is the inclusion of the mobile device phone number in the HTTP header of the message 720 sent to the security server 140 (via the mobile carrier 120). Enriched HTTP headers are commonly used by mobile carriers in messages sent to websites (see, e.g., www.techrepublic.com/it-security/why-are-websites-getting your mobile-phone-number), such as at the header field "HTTP_X_UP_CALLING_LINE_ID" illustrated in the message 720, and at step 624 the security server 140 compares the phone number received in the device authentication request 720 with the trusted phone number that it received from the transaction server in the authentication request message 712.

The security server 140 then provides, at step 630, a device authentication response message 732 to the mobile device, that includes the bank return URL, which at step 632 advances the displayed website of the bank to a device authentication page, indicating to the user's mobile device that it is in the process of being authenticated by the bank. The underlying script programming at the website then sends, at step 634, an authentication confirmation request message 734 to the security server 140 requesting that the security server provide the status of the mobile device authentication process.

In one embodiment, the determined status of the authentication process can be one of (1) a match at step 624 with the authentication confirmed (Green) so that the transaction can proceed (2) no match at step 624, indicating the authentication has failed (Red) and that the transaction should be declined, and (3) the security server is unable to perform the comparison of phone numbers (Yellow), for example, because wireless transmissions have failed or the data coverage of the mobile device will not permit the required text message or HTTP messages.

At step 636, the security server 140 provides the determined status as part of an authentication confirmation response message 736, which in turn leads to the transaction server either advancing the website page to permit the transaction to proceed, or displaying a message that the transaction cannot be completed. As discussed earlier, in this described embodiment, if the mobile phone has been authenticated (e.g., the actual mobile device of an authorized customer is being used to access an account at a bank), no one-time password need be entered by the user or otherwise used to populate a field in the online banking website.

One variation of the embodiment illustrated in FIGS. 6 and 7 eliminates the need for the SMS message 716 from the mobile carrier 122 to the user mobile device 110. This alternative embodiment would involve functions performed by an transaction app that has been loaded on the mobile device (during enrollment) for purposes of accessing the bank website at the transaction server 130. The app could be triggered by a data message sent from the transaction server 130 when a user is requesting access to an account. Specifically, when a mobile device initiates a transaction at the transaction server, a message is returned to the mobile device asking that the mobile device, under the control of the transaction app, return a authentication request (comparable to the message 720 seen in FIG. 7). The returned authentication request would have an HTTP header similar to that described earlier in conjunction with message 720, including the phone number (automatically inserted by the wireless carrier as part of the message header) assigned to the device that is running and interfacing with the app. If it is the authorized customer using the app, the authorized phone number is returned. If it is a fraudster that is using the app to access a website at the transaction server, the phone number of the fraudster's phone is returned as part of the device authentication request. Thus, in this embodiment, the "event" that results in the device authentication request (e.g., message 720 of FIG. 7), is a data message from the transaction server triggering a device authentication request rather than a user clicking on a link in SMS message sent from the mobile carrier.

Figure 8:
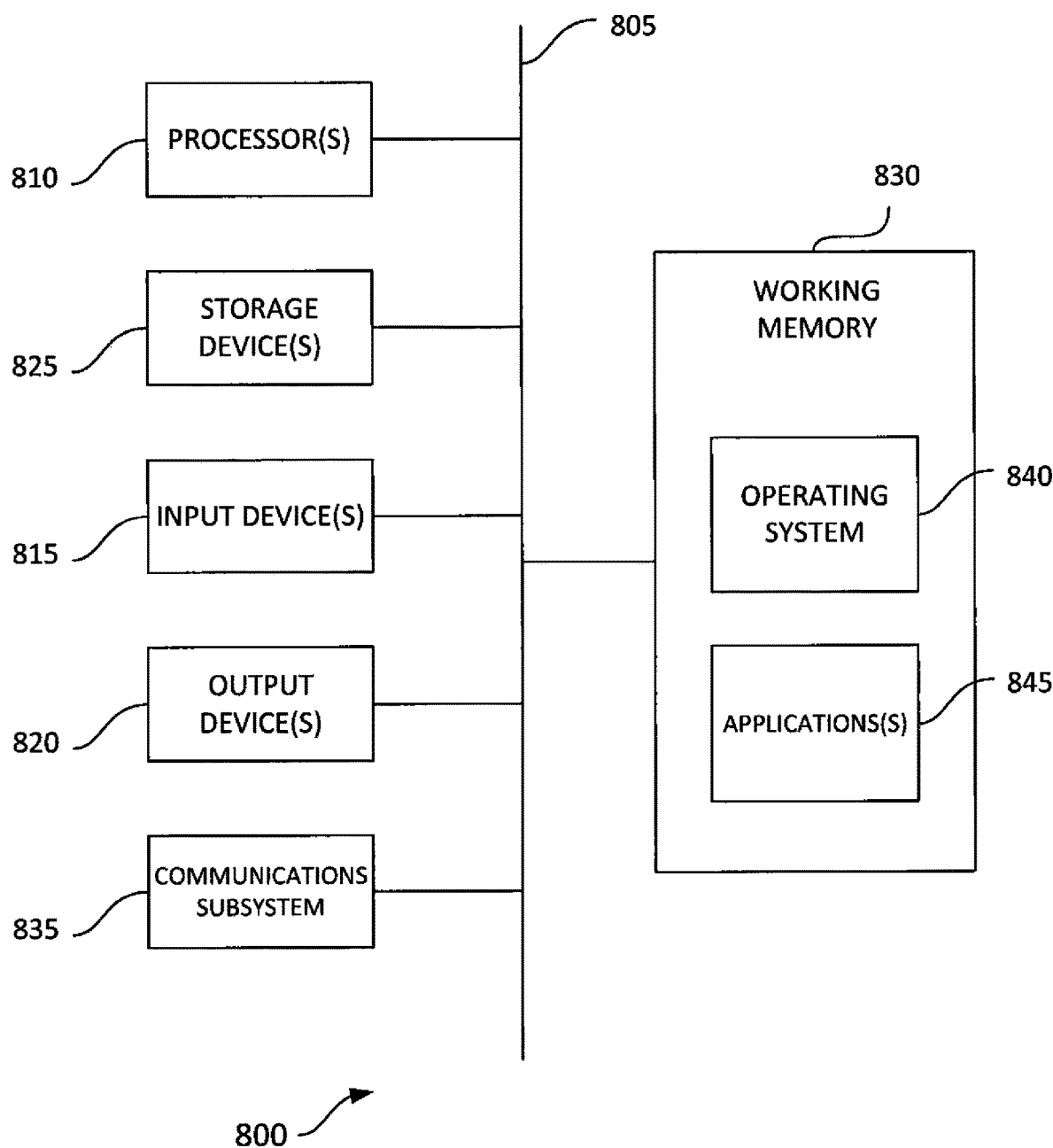
FIG. 8 is a block diagram illustrating an exemplary computer system upon which embodiments of the present invention may be implemented.

FIG. 8 is a block diagram illustrating an exemplary computer system upon which embodiments of the present invention may be implemented. The computer system 800 may be used, in whole, in part, or with various modifications, to provide the functions of the security server 140 and transaction server 130, and provide the functions of the components of the mobile device 110.

The computer system 800 is shown comprising hardware elements that can be electrically coupled or otherwise in communication via a bus 805. The hardware elements can include one or more processors 810, including, without limitation, one or more general-purpose processors and/or one or more special-purpose processors (such as digital signal processing chips, graphics acceleration chips, and/or the like); one or more input devices 815, which can include, without limitation, a mouse, a keyboard and/or the like; and one or more output devices 820, which can include, without limitation, a display device, a printer and/or the like.

The computer system 800 may further include one or more storage devices 825, which can comprise, without limitation, local and/or network accessible storage or memory systems having computer or machine readable media. Common forms of physical and/or tangible computer readable media include, as examples, a hard disk, magnetic tape, or any other magnetic medium, an optical medium (such as CD-ROM), a random access memory (RAM), a read only memory (ROM) which can be programmable or flash-updateable or the like, and any other memory chip, cartridge, or medium from which a computer can read data, instructions and/or code. In many embodiments, the computer system 800 will further comprise a working memory 830, which could include (but is not limited to) a RAM or ROM device, as described above.

The computer system 800 also may further include a communications subsystem 835, such as (without limitation) a modem, a network card (wireless or wired), an infra-red communication device, or a wireless communication device and/or chipset, such as a Bluetooth® device, an 802.11 device, a WiFi device, a WiMax device, a near field communications (NFC) device, cellular communication facilities, etc. The communications subsystem 835 may permit data to be exchanged with a network, and/or any other devices described herein. Transmission media used by communications subsystem 835 (and the bus 805) may include copper wire, coaxial cables and fiber optics. Hence, transmission media can also take the form of waves (including, without limitation radio, acoustic and/or light waves, such as those generated during radio-wave and infra-red data communications).

The computer system 800 can also comprise software elements, illustrated within the working memory 830, including an operating system 840 and/or other code, such as one or more application programs 845, which may be designed to implement, as an example, the processes seen in FIGS. 2 and 3, and thus provide specially designed and programmed devices (e.g., mobile device 110, transaction server 130 and security server 140) for carrying out the novel features described herein.

As an example, one or more methods discussed earlier might be implemented as code and/or instructions executable by a computer (and/or a processor within a computer). In some cases, a set of these instructions and/or code might be stored on a computer readable storage medium that is part of the system 800, such as the storage device(s) 825. In other embodiments, the storage medium might be separate from a computer system (e.g., a removable medium, such as a compact disc, etc.), and/or provided in an installation package with the instructions/code stored thereon. These instructions might take the form of code which is executable by the computer system 800 and/or might take the form of source and/or installable code, which is compiled and/or installed on the computer system 800 (e.g., using any of a variety of generally available compilers, installation programs, compression/decompression utilities, etc.). The communications subsystem 835 (and/or components thereof) generally will receive the signals (and/or the data, instructions, etc., carried by the signals), and the bus 805 then might carry those signals to the working memory 830, from which the processor(s) 805 retrieves and executes the instructions. The instructions received by the working memory 830 may optionally be stored on storage device 825 either before or after execution by the processor(s) 810.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the transaction server 130 and security server 140 may each be implemented by a single system having one or more storage device and processing elements, or alternatively, may each be implemented by plural systems, with their respective functions distributed across different systems either in one location or across a plurality of linked locations.

Moreover, while the various flows and processes described herein (e.g., those illustrated in FIGS. 2, 3, 6 and 7) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for authenticating a mobile device in a transaction where a one-time password is used to authenticate a user of the mobile device, comprising:
    a processor at the mobile device;
    a subscriber identity module at the mobile device, the subscriber identity module containing a unique mobile ID assigned to the mobile device; and
    a memory, the memory storing instructions that, when executed by the processor, cause the processor to:
    receive, from a security server when the mobile device is being used to conduct a transaction, a hyperlink, with the hyperlink including metadata having a one-time password;
    in response to the hyperlink being selected at the mobile device, retrieve from the subscriber identity module, the unique mobile ID, and populate the one-time password at a password field at the mobile device for being provided to a transaction server to authenticate the user;
    provide the retrieved unique mobile ID to the security server for comparison to a mobile ID that has been validated as associated with the mobile device; and
    provide the one-time password to the transaction server at which the transaction is being conducted, to authenticate the user of the mobile device with the one-time password and complete the transaction, only if the retrieved mobile ID matches the validated mobile ID.

2. The system of claim 1, wherein the hyperlink identifies an application resident at the mobile device, and wherein the application resident at the mobile device is launched by the processor in order to retrieve, from the subscriber identity module, the unique mobile ID and populate the one-time password at the password field at the mobile device.

3. The system of claim 1, wherein the hyperlink includes instructions that, when the hyperlink is selected, cause the processor to retrieve, from the subscriber identity module, the unique mobile ID.

4. The system of claim 1, wherein the stored instructions, when executed by the processor further cause the processor to:
    provide the retrieved unique mobile ID for comparison to the validated mobile ID by transmitting the retrieved unique mobile ID to the security server, wherein the security server retrieves the validated mobile ID from a mobile ID database associated with the security server, and wherein the security server:
    compares the validated mobile ID with the unique mobile ID retrieved from the subscriber identity module to authenticate the mobile device.

5. The system of claim 1, wherein the stored instructions, when executed by the processor, further cause the processor to:
    provide the password field, within a data record at the mobile device, for being populated with the one-time password; and
    automatically populate the password field with the one-time password in the hyperlink from the security server.

6. The system of claim 5, wherein the stored instructions, when executed by the processor, further cause the processor to:
    provide the data record, including the populated password field, to the transaction server.

7. The system of claim 6, wherein the security server receives, from the transaction server, a request to authenticate the mobile device when the mobile device is being used to conduct a transaction, wherein the request includes information identifying a user associated with the mobile device, and wherein the hyperlink is transmitted from the security server to the mobile device, based on the information identifying the user associated with the mobile device.

8. The system of claim 7, wherein the information identifying the user associated with the mobile device comprises a mobile device telephone number.

9. The system of claim 1, wherein the hyperlink includes an associated hyperlink active period, and wherein the stored instructions will cause the processor to, in response to the hyperlink being selected at the mobile device, retrieve from the subscriber identity module, the unique mobile ID, only when it is selected prior to expiration of the hyperlink active period.

10. The system of claim 1, wherein the hyperlink includes an associated hyperlink time limit, and wherein the unique mobile ID is retrieved in response to the hyperlink being selected at the mobile device, only if the hyperlink is selected prior to the expiration of the hyperlink time limit.

11. The system of claim 1, wherein the one-time password includes an associated password time limit, and wherein one-time password authenticates the user only if the one-time password is provided to the transaction server prior to expiration of the password time limit.

12. The system of claim 1, wherein the unique mobile ID is an internal identifier used by a wireless service provider to communicate with the mobile device.

13. The system of claim 12, wherein the unique mobile ID is an international mobile subscriber identity (IMSI).

14. A method for authenticating a mobile device in a transaction where a one-time password is used to authenticate a user of the mobile device, comprising:
receiving, from a security server when the mobile device is being used to conduct a transaction, a hyperlink, with the hyperlink including metadata having a one-time password;
in response to the hyperlink being selected at the mobile device, retrieving from a subscriber identity module at the mobile device, a unique mobile ID, and populating the one-time password at a password field at the mobile device for being provided to a transaction server to authenticate the user;
providing the retrieved unique mobile ID to the security server for comparison to a mobile ID that has been validated as associated with the mobile device; and
authenticating the user of the mobile device with the one-time password and completing the transaction at the transaction server, only if the retrieved mobile ID matches the validated mobile ID.

15. The method of claim 14, wherein the hyperlink identifies an application resident at the mobile device, and wherein the application resident at the mobile device is launched by the processor at the mobile device in order to retrieve, from the subscriber identity module, the unique mobile ID and populate the one-time password at the password field at the mobile device.

16. The method of claim 14, further comprising:
retrieving at the security server the validated mobile ID from a mobile ID database associated with the security server; and
comparing at the security server the validated mobile ID with the unique mobile ID retrieved from the subscriber identity module to authenticate the mobile device.

17. The method of claim 14, wherein the security server receives, from the transaction server, a request to authenticate the mobile device when the mobile device is being used to conduct a transaction, wherein the request includes information identifying a user associated with the mobile device, and wherein the hyperlink is transmitted from the security server to the mobile device, based on the information identifying the user associated with the mobile device.

18. The method of claim 17, wherein the information identifying the user associated with the mobile device comprises a mobile device telephone number.

19. The method of claim 14, wherein the hyperlink includes an associated hyperlink active period, and wherein the stored instructions will cause the processor to, in response to the hyperlink being selected at the mobile device, retrieve from the subscriber identity module, the unique mobile ID, only when it is selected prior to expiration of the hyperlink active period.

20. The method of claim 14, wherein the hyperlink includes an associated hyperlink time limit, and wherein, the unique mobile ID is retrieved in response to the hyperlink being selected at the mobile device, only if the hyperlink is selected prior to the expiration of the hyperlink time limit.

* * * * *